Jan. 6, 1970 W. D. FORTNER 3,488,655

DUAL CHANNEL ASYNCHRONOUS OBJECT IDENTIFICATION SYSTEM

Filed Oct. 3, 1968 2 Sheets-Sheet 1

INVENTOR.
WILLIAM D. FORTNER

BY Kinzer, Dorn & Zickert
ATTYS.

Jan. 6, 1970 W. D. FORTNER 3,488,655

DUAL CHANNEL ASYNCHRONOUS OBJECT IDENTIFICATION SYSTEM

Filed Oct. 3, 1968 2 Sheets-Sheet 2

INVENTOR.
WILLIAM D. FORTNER

BY Kinzer, Dorn & Zickert
ATTYS.

United States Patent Office 3,488,655
Patented Jan. 6, 1970

3,488,655
DUAL CHANNEL ASYNCHRONOUS OBJECT IDENTIFICATION SYSTEM

William D. Fortner, San Diego, Calif., assignor to Abex Corporation, New York, N.Y., a corporation of Delaware

Filed Oct. 3, 1968, Ser. No. 764,665
Int. Cl. G01s *9/56*
U.S. Cl. 343—6.5 6 Claims

ABSTRACT OF THE DISCLOSURE

An automatic object identification system in which two microwave or another high frequency signals are radiated toward an identification member mounted on an object to be identified. The two signals are substantially different in frequency, though in the same spectrum, and have substantially different polarizations. Individual elements of the identification member reflect the first signal with a particular polarization change but do not effect a corresponding change in the second signal polarization; other identification elements reflect the second signal with an appreciable change in polarization but do not cause corresponding polarization change in the first signal. Two receivers segregate the reflected signals by frequency and by polarization to identify the object.

BACKGROUND OF THE INVENTION

A number of different systems have been proposed for automatic identification of individual objects, many of which use scanning signals in the microwave or in the light spectrum. In some of these systems, a radiant signal is directed toward an identification position through which a coded identification member moves in the course of the scanning operation. The incident signal is reflected, frequently with a change in polarization, to a receiver that decodes the reflected signal to identify the object. Systems of this general kind, particularly useful in the identification of railroad cars and other large objects, are described and claimed in Bradford et al. Patent No. 3,247,508 and Hamann et al. Patent No. 3,247,509. Specific forms of microwave target structures for systems of this kind are described in other patents including Molnar et al. Patent No. 3,247,510, Hamann et al. Patent No. 3,247,514, and Mori Patent No. 3,311,915.

In many of the systems proposed in the prior art, the identification members are encoded in accordance with a binary code in an arrangment that provides for positive signal returns only with respect to one binary valve. Typically, a positive signal return is provided for each binary "one" in the code, with no positive return for binary "zeros." Systems of this sort require synchronous operation, as the identification member is moved through the identification position to effect the required scanning operation, which may lead to errors in insertion of the binary zeros in the decoded data.

Some of the proposed systems have been asychronous in operation, affording signal returns for both binary values. One particularly effective system of this sort is described and claimed in Mori Patent No. 3,362,025, in which two code elements are employed to signify each binary value, with the transition from a positive signal return to a no-signal condition signifying one binary value and the reverse transition signifying the other binary value. Systems of this type, however, lead to some complexity in the target structure and may cause difficulty in assembling accurately encoded identification members. In any of the asychronous systems proposed, difficulty is likely to be encountered in distinguishing between the two different binary values respresented by the signals reflected or re-radiated from the identification members.

SUMMARY OF THE INVENTION

It is a principal object of the invention, therefore, to provide a new and improved asychronous automatic object identification system that utilizes passive coded reflectors on the objects to be identified and that affords distinctively different positive signal returns for the two different binary values.

A related object of the invention is to provide for complete and effective discrimination between two related but specifically different radiated signals, in an automatic object identification system, with one of those signals assigned directly to one binary value and the other signal assigned to the other binary value.

A more specific object of the invention is to provide a practical and economical two-frequency automatic object identification system adaptable to either microwave or optical apparatus.

Accordingly, the invention is directed to an automatic object identification system comprising a first transmitter for radiating a signal of predetermined fundamental frequency *f*1, having a polarization P1, along a reference path toward an object to be identified at an identification position on that path. The system further comprises a second transmitter for radiating a signal of predetermined fundamental frequency *f*2, having a polarization P2, along the same path toward the identification position, *f*2 and P2 being substantially different from *f*1 and P1, respectively. The system employs a plurality of coded identification members, one for each object, each comprising a plurality of first code elements interspersed with a plurality of second code elements. The first code elements reflect impinging signals of polarization P1 at a new polarization P3 but do not cause a corresponding change in polarization in the reflection of signals of polarization P2. The second code elements reflect impinging signals of polarization P2 at a new polarization P4 but do not make a corresponding change in the reflection of signals of initial polarization P1. Preferably, all of the code elements are retroreflective. The system further includes a first receiving means that is responsive only to signals of frequency *f*1 having a polarization P3 and a second receiving means responsive only to signals of frequency *f*2 having a polarization P4. Both receiving means are coupled to appropriate decoding means for identifying the objects incorporated in the system.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

DESCRIPTION OF THE PREFERRED EMBODIMENTS

Figure 1:
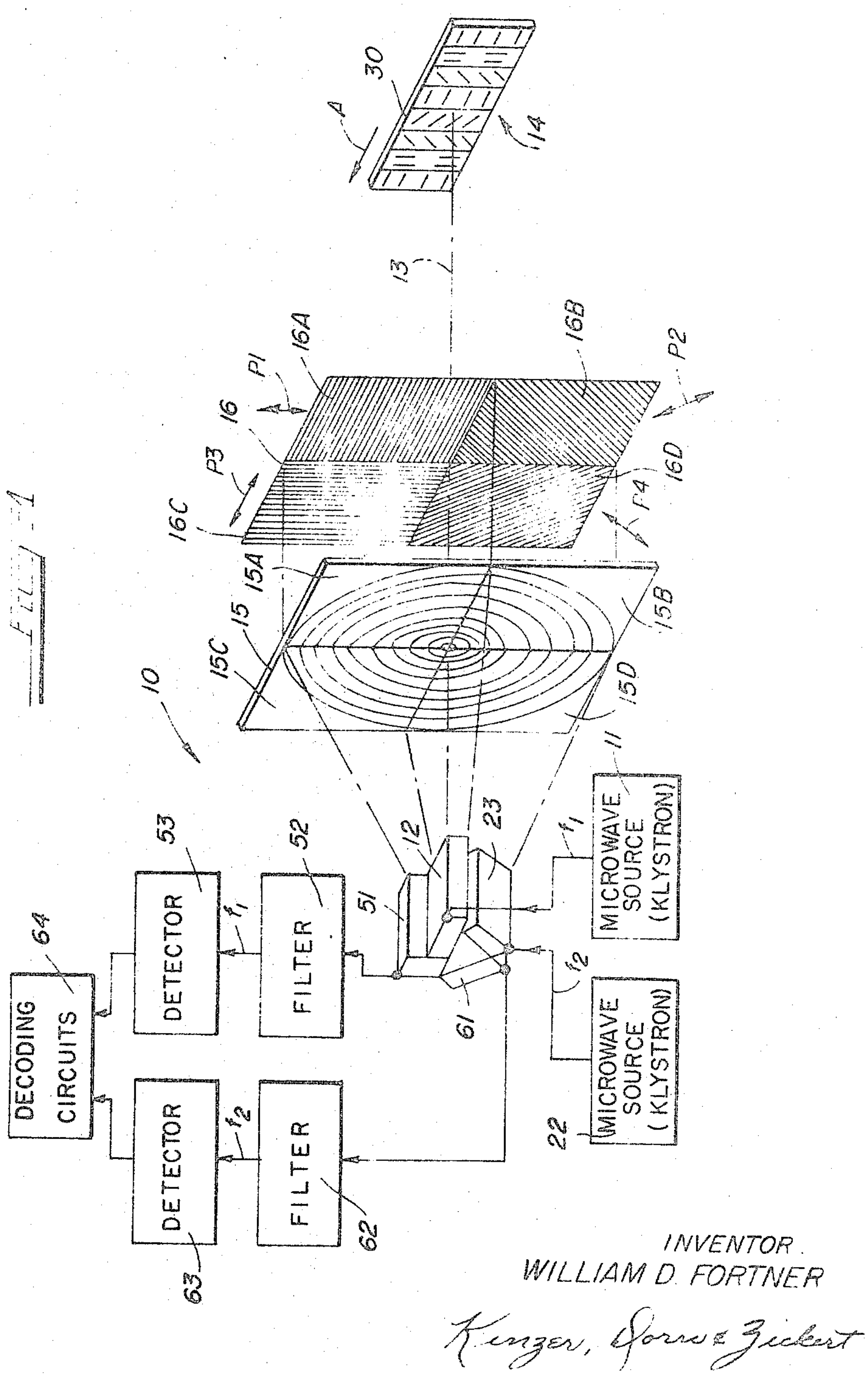
FIG. 1 is a schematic diagram, partly in perspective, of an automatic object identification system constructed in accordance with one embodiment of the present invention.

FIG. 1 illustrates an automatic object identification system 10 constructed in accordance with one embodiment of the present invention. System 10 comprises a first transmitter 11 for generating a signal of predetermined fundamental frequency *f*1. In the illustrated form, transmitter 11 is a microwave transmitter, powered by a klystron oscillator or other comparable apparatus capable of operation at microwave frequencies. The transmitter includes a radiating wave guide 12 that radiates the microwave signal along a given reference path, generally indicated by the phantom line 13, toward an identification position 14 on the path.

A zone plate lens 15 is incorporated in system 10 and is interposed between the transmitting wave guide 12 and the identification position 14. Preferably, the zone plate lens has a back focal length (from wave guide 12 to lens 15) that is substantially shorter than its front focal length (from the lens to identification position 14). Wave guide 12 is aligned with the lower left-hand corner of the upper right-hand quadrant 15A of the lens. The microwave signal, as radiated from wave guide 12, is a vertically polarized signal as indicated by the arrow P1 in FIG. 1. A polarization grid 16A is disposed in alignment with the lens quadrant 15A, limiting transmission of signals from wave guide 12 toward identification position 14 to vertically polarized signals.

Identification system 10 further includes a second transmitter 22 that develops a second microwave signal having a frequency *f*2. The second signal is radiated along path 13 by a second transmitting wave guide 23 that is aligned with the upper left-hand corner of the quadrant 15B of zone plate lens 15. The second signal, as radiated by wave guide 23, is polarized at an angle of approximately 135° to the horizontal as indicated by the arrow P2 and thus differs in polarization from the first signal by 45°. A second polarization grid 16B is aligned with lens quadrant 15B to restrict the signals transmitted from wave guide 23 toward identification position 14 to those signals polarized as indicated by arrow P2.

Figure 2:
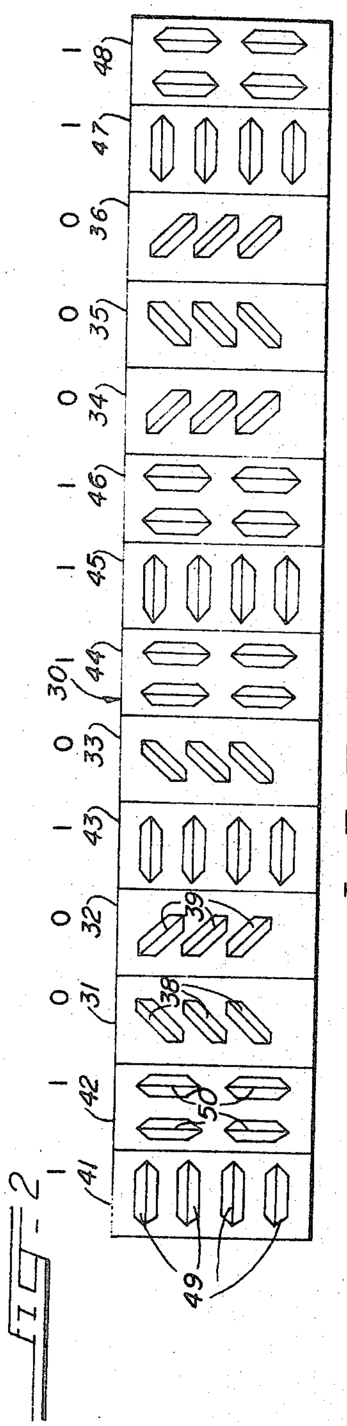
FIG. 2 is an enlarged elevation view of one form of code identification member that may be incorporated in the system of FIG. 1.

Each of the objects to be identified in system 10 carries a coded identification member; one such identification member 30 is shown generally in FIG. 1 and is illustrated in greater detail in FIG. 2. As best shown in FIG. 2, identification member 30 comprises a plurality of first code elements 31, 32, 33, 34, 35 and 36 that are interspersed with a plurality of second code elements 41 through 48. The code elements 31–36 of the first group each represent a binary zero; the code elements 41–46 of the second group each represent a binary one.

The code elements of the first group are not identical to each other. Rather, they form two different sub-groups. Thus, the initial code element 31 of the first group comprises a plurality of individual corner reflectors 38 each aligned with its apexial axis extending at an angle of 45° to the horizontal. Code element 32, on the other hand, although it belong to the same basic group as code element 31, comprises a plurality of individual corner reflectors 39 each having its apexial axis aligned at an angle of 135° to the horizontal. The odd-numbered code elements of the first group are all similar in construction to code element 31 and the even-numbered code elements of this group all correspond in construction to code element 32. Although code elements 31 and 32 are specifically different in construction from each other, they produce the same basic operational effect on the polarization of reflected signals, as discussed more fully hereinafter in connection with FIG. 3.

Code element 41 is typical of the odd-numbered code elements in the second group. It includes a plurality of individual corner reflectors 49 each having its apex axis aligned in a horizontal direction. Code element 42 is typical of the even-numbered code elements of the second group. It includes a plurality of individual corner reflectors 50 mounted on identification member 30 with their apexial axes disposed in vertical alignment. Again, however, the net operational effect of the two specifically different code elements in the second group, such as elements 41 and 42, is the same.

Figure 3:
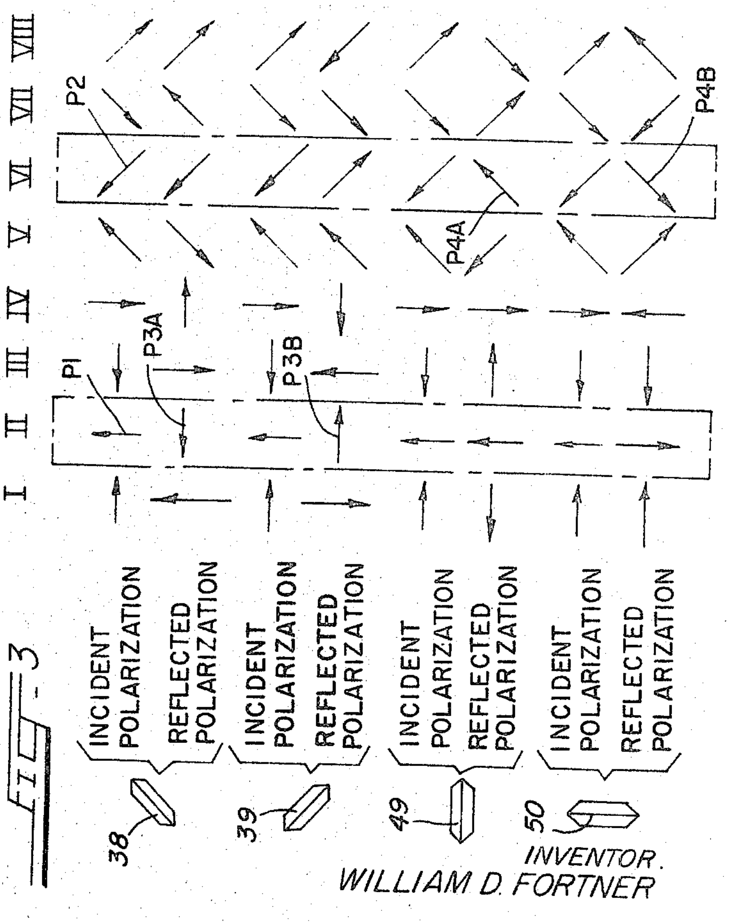
FIG. 3 is a series of explanatory diagrams illustrating the effect of different reflector elements of the identification member of FIG. 2 on the polarization of signals reflected by those elements.

The effect of the individual corner reflectors 38, 39, 49 and 50 upon the polarization of microwave signals received and reflected by the code elements is illustrated in FIG. 3. Column I shows the polarization of the reflected signal from each of the different corner reflector code elements where the incident signal is horizontally polarized at an angle of zero degrees. This signal, impinging upon one of the corner reflector code elements 38 oriented at an angle of 45°, is reflected with a polarization rotation totalling 270°, taking into account the phase reversal introduced into a plane-polarized electromagnetic wave reflected from a metallic surface. Thus, the reflected polarization of the signal is at 90°. The same signal, impinging upon one of the corner reflectors 39 oriented at 135°, is also rotated 270°, producing a reflected signal polarized at 270° to the horizontal. The same signal is reflected by the horizontally oriented corner reflector 49 with only a phase reversal and by the vertically oriented corner reflector 50 with no effective change in polarization.

Column II in FIG. 3 illustrates the changes in polarization for the various corner reflector code elements for an incident signal polarized at 90° to the horizontal, the polarization P1 for the signal *f*1 in the system of FIG. 1. The 90° polarized signal is reflected by corner reflector 38 with a change to a polarization of 270°, as indicated by the arrow P34A. The same signal impinging upon corner reflector 39 is reflected with a polarization of 0° as indicated by arrow P3B. The horizontally aligned corner reflector element 49 reflects the same signal with no effective polarization change whereas the vertically oriented corner reflector 50 reflects the signal with a polarization of 270°.

Column VI of FIG. 3 affords a specific illustration of the effect of the corner reflector code elements upon the second signal *f*2, initially transmitted with a polarization P2 of 135°. As shown therein this signal is reflected by the 45° corner reflector 38 with no effective change of polarization. The signal of polarization P2 is reflected by the 135° corner reflector 39 in reverse phase. The horizontally oriented corner reflector 49, on the other hand, rotates the polarization of the signal, as reflected, to an angle of 45° as indicated by the arrow P4A. The same signal impinging upon the vertically oriented corner reflector 50 is reflected with a shift in polarization to an angle of 225° as indicated by the arrow P4B.

In order to interpret the polarization changes and their effect upon decoding of the data carried by identification member 30, it is first necessary to consider the receiving apparatus that is incorporated in the identification system 10. The identification system includes a first receiving means that is responsive only to signals having the frequency *f*1 and polarized along a horizontal axis at either 0° or 180° as indicated by the dual arrow P3 in FIG. 1. This receiving means includes a polarization grid 16C positioned in alignment with the upper left-hand quadrant 15C of the zone plate lens 15. Grid 16C includes a multiplicity of vertically aligned conductive grid elements; it is essentially transparent to horizontally polarized signals but is increasingly opaque with respect to signals polarized in any direction that constitutes a substantial departure from the horizontal.

The first receiving means in system 10 further includes a receiving wave guide antenna 51 that is aligned with the lower right-hand corner of lens quadrature 15C. Antenna 51 is connected to a band pass filter 52 that is in turn coupled to a detector 53.

Identification system 10 further includes a second receiving means that is generally similar to the first receiving means. This second receiving means comprises a polarization grid 16D that is aligned with the lower left-hand quadrant of zone plate lens 15. Grid D includes a multiplicity of linear conductive elements each aligned at an angle of 135° to the horizontal. This portion of the grid structure readily passes signals polarized along an axis of 45°–225° to the horizontal as indicated by the dual arrow P4 but effectively rejects signals having a substantially different polarization.

The second receiving means further includes a wave guide antenna 61 that is aligned generally with the upper right-hand corner of the remaining lens guadrant 15D. Antenna 61 is coupled to a band pass filter 62 in turn connected to a detector circuit 63. The two detector circuits 53 and 63 of the first and second receiving means, respectively, each have an output coupled to a decoding circuit unit 64.

In considering operation of the complete identification system 10, and referring to FIGS. 1–3, it may first be assumed that the identification member 30 is moving through identification position 14 in the direction of the arrow A (FIG. 1) and that the first code element upon which the two microwave signals from antennas 12 and 23 are focused is the code element 41 (FIG. 2). As shown in FIG. 3, the vertically polarized signal at frequency *f*1 and polarization P1, impinging upon the horizontally oriented corner reflectors 49 of code element 41, are reflected with no effective change in polarization. These reflected signals are thus cross-polarized with respect to the plane of P3 so that they cannot pass through the polarization grid 16C. Thus the first signal, *f*1, as reflected by the code elements 41 is rejected by the polarization grid 16C, and does not produce an appreciable signal in the receiving means comprising waveguide 51. Any signal *f*1 entering the receiving means comprising waveguide 61 is rejected by the filter 62.

The second signal, at frequency *f*2 and polarization P2, on the other hand, is reflected by the corner reflectors 49 of code element 41 with a polarization of 45° as indicated by arrow P4A (FIG. 3, column VI). This signal is thus polarized in accordance with one of the two directions that readily pass through polarization grid 16D, as indicated by arrow P4 in FIG. 1. Accordingly, an appreciable return signal is received by antenna 61 and supplied to filter 62. That signal is at the frequency *f*2 which is passed by filter 62. Accordingly, a signal pulse is detected in detector 63 and supplied to decoding circuit 64 to indicate the presence of a binary one on the identification member.

The same signal at frequency *f*2 and initial orientation P2, when reflected with polarization P4A, is greatly attenuated by polarization grid 16C. Consequently, no more than a weak signal is returned to the receiving wave guide antenna 51. Furthermore, the received signal is at the frequency *f*2, which is rejected in filter 52. Accordingly, there is no appreciable output from detector 53 so that no erroneous zero signal is supplied to decoding circuit 64.

The next code element in the sequence to reach the identification position 14 is the code element 42 (FIG. 2) with vertically oriented corner reflector elements 50. As indicated in column 6 of FIG. 3, this signal is reflected from the identification member, and specifically corner reflector 42, with a polarization P4B. Signals polarized in this direction readily pass through receiving grid 16D (FIG. 1) and again produce a positive signal indicative of a binary one. Again, the polarization and the frequency of the reflected signal are both utilized as a basis for rejection of the signal in the receiving means comprising polarization grid 16C, wave guide 51, and filter 52, so that no spurious binary zero signal is supplied to the decoding circuits. Furthermore, and as in the example given with respect to code element 41, the vertically polarized signal of frequency *f*1 and polarization P1, as reflected, still has a vertical polarization and cannot pass the polarization grid 16C. The signal of frequency *f*1, which does pass through polarization grid 16D, is rejected by filter 62 so that it does not confuse operation of the system.

The next code element 31 (FIG. 2) to reach identification position 14 (FIG. 1) corresponds to a binary zero. The corner reflectors 38 of this code element, oriented at 45° to the horizontal, reflect the incident signal of frequency *f*1 and polarization P1 with a horizontal polarization P3A (FIG. 3 column II). Signals at this orientation readily pass through the polarization grid 16C, as indicated by the polarization arrow P3 for that portion of the grid. These signals are intercepted by the receiving wave guide 51 and supplied to filter 52. Since the received signals are at the frequency *f*1 they are passed by the filter and supplied to detector 53 to develop a signal pulse positively identifying the presence of a binary zero on the identification member.

The signals at orientation P2 and frequency *f*2, as reflected from code element 31, are rejected on the basis of both frequency and polarization by the receiving apparatus of identification system 10. Furthermore, the polarization and frequency of the *f*1, P1 signal, as reflected, cannot excite the second receiving means 61–63. Consequently, the only appreciable signal supplied to the decoding circuit 64 is one indicative of a binary zero.

Essentially the same operation occurs when the next code element 32 reaches the identification position. Its corner reflectors 39 reflect the first signal *f*1 with a horizontal polarization P3B (FIG. 3 Column II). This signal readily passes the polarization grid section 16C and the signal frequency is correct to produce a positive signal indication of the presence of a binary zero on the identification target. This same reflected signal, however, is rejected on the basis of both polarization and frequency in the second receiving means of the system and cannot produce an erroneous indication of a binary one.

From the foregoing description, it will be seen that identification system 10 provides for the emission of two "tones," the signals of frequencies *f*1 and *f*2 radiated by the wave guide antennas 12 and 23 respectively. The two transmitting wave guide antennas are focused by lens 15 at a common identification position or area 14 within a common focal zone.

In the identification members used in the system, such as member 30, there are surfaces which provide specular reflection. But the operative code elements each include one or more reflecting surfaces (corner reflectors in the illustrated embodiment) that reflect one of the two incident signals with a polarization that is orthogonal to the incident electric field. The specular body of the identification member, as well as most other reflectors on a typical railroad car or other object to which the identification member may be attached, do not reflect an orthogonal field component. That is, the signals reflected from the corner reflector elements (or other reflector elements having polarization-rotation properties) on the identification member are cross-polarized whereas signals reflected from other surrounding areas are preponderantly co-polarized. Thus, the polarization characteristics of the identification members and the background make it possible to use cross-polarized transmitting and receiving antennas, at the two different operating frequencies, to discriminate against background reflections.

The identification system 10 provides two simultaneous channels of information with a crosstalk level that can be made to be better than minus 30 decibels. This is more than adequate to afford positive differentiation between the reflected signals pertaining to the two different binary values. The signal returns for the two binary values are distinctively different and cannot be confused in the system.

In system 10, it is not essential to use all four of the different forms of identification code elements illustrated in connection with FIG. 2. For example, all of the binary one code elements could employ horizontally-oriented reflectors 49 and all of the binary zero code elements could include reflectors having their axes oriented at an angle of 45° as in the code element 31. However, the illustrated arrangement is preferred because it provides for a better distinction between adjacent code elements having the same binary value (e.g., code elements 41 and 42). Of course, it will be recognized that the illustrated code element orientations are not restricted to the binary value connotations described above; code elements 41–48 could represent binary zeroes with code elements 31–36 representative of binary ones. Furthermore, the polarization of the $f1$ signal can be changed to 0°, 180° or 270° without changing operation of the system (Col I, III, IV, FIG. 3). Similarly, changing the polarization of the $f2$ signal to 45°, 225° or 315° (FIG. 3, Col. V, VII, VIII) does not change system operation. For effective signal discrimination, in the system, the polarizations of the two radiated signals should differ from each other by an odd integral multiple of 45° and the same difference in polarization should obtain with respect to the two reflected signals.

In FIG. 1, lens 15 and polarization grid 16 are shown separated from each other, but this has been done solely to facilitate illustration of these portions of the system. In a practical construction, it may be desirable to mount the polarization grid conductors directly on the same dielectric sheet as the zone plate lens. Furthermore, it is not essential that the polarization grid structure be interposed between the lens and the identification member. Rather, the polarization grid may be located between the lens and the transmitting and receiving wave guide antennas. In some applications, it may be desirable to use two polarization grids, one located on each side of the lens.

Figure 4:
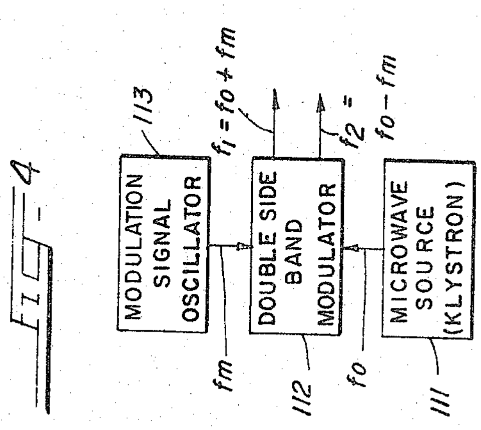
FIG. 4 is a block diagram illustrating a modification of a part of the system of FIG. 1.

Identification system 10, as illustrated in FIG. 1, employs two separate microwave oscillators 11 and 22. An alternate construction that produces the same basic operational effects is illustrated in FIG. 4. The transmitter apparatus shown therein comprises a single microwave oscillator 111 producing an output signal at $fo$, that signal being supplied to a double side band modulator 112. The apparatus of FIG. 4 further includes a second oscillator 113 that develops a modulation signal at a frequency $fm$ that is substantially lower than the microwave range, this modulation frequency also being supplied to modulator 112. The double side band modulator 112 produces two output signals at frequencies $f1$ and $f2$, where $$f1 = fo + fm$$

$$f2 = fo - fm$$

The two signals at frequencies $f1$ and $f2$ are employed as described above in connection with FIG. 1. A somewhat similar arrangement can be provided with a single microwave oscillator having an output modulated at two different video frequencies, with frequency selection effected in the video portions of the receiving apparatus.

Hence, while preferred embodiments of the invention have been described and illustrated, it is to be understood that they are capable of variation and modification.

I claim:

1. An automatic object identification system comprising:

a first transmitter for radiating a first signal of predetermined fundamental frequency $f1$, and with a polarization P1, along a reference path toward an object identification position on that path;

a second transmitter for radiating a second signal of predetermined fundamental frequency $f2$ and with a polarization P2 along said path toward said identification position, with $f2$ and P2 being substantially different from $f1$ and P1, respectively;

a plurality of coded identification members, one for each object, each member comprising a plurality of first code elements interspersed with a plurality of second code elements, said first code elements being effective to reflect impinging signals of polarization P1 at a new polarization P3 but without a corresponding change in polarization in reflection of signals of polarization P2, and said second code elements being effective to reflect impinging signals of polarization P2 at a new polarization P4 but without a corresponding change in reflection of signals of polarization P1, whenever the identification member is at said identification position;

first receiving means responsive only to signals of frequency $f1$ and polarization P3;

second receiving means responsive only to signals of frequency $f2$ and polarization P4;

and means, coupled to both of said receiving means, for decoding the signals from said receivers.

2. An automatic object identification system according to claim 1 in which each of said signal frequencies $f1$ and $f2$ is in or above the microwave range and in which the polarizations P1 and P2 differ by an angle approximately equal to an odd integral multiple of 45°.

3. An automatic object identification system according to claim 2 in which the polarization changes from P1 to P3 and from P2 to P4 each constitute a rotation of polarization through an angle of approximately 90°.

4. An automatic object identification system according to claim 1, said system further including first and second polarization grids restricting said signals radiated from said first and second transmitters to signals of polarizations P1 and P2, respectively, and additional polarization grids restricting reflected signals supplied to said first and second receiving means to signals of polarizations P3 and P4, respectively.

5. An automatic object identification system according to claim 1 in which said first and second signal frequencies $f1$ and $f2$ are both in the microwave range, and in which each of said transmitters includes an independent microwave-frequency oscillator.

6. An automatic object identification system according to claim 1 in which said first and second signal frequencies $f1$ and $f2$ are both in the microwave range, and in which said first and second transmitters comprise a single oscillator producing an initial signal having a frequency $fo$ in the microwave range and modulating means for modulating said initial signal to develop said first and second signals.

References Cited

UNITED STATES PATENTS

| | | | |
|---|---|---|---|
| Re. 26,292 | 10/1967 | Bradford et al. | |
| 3,247,510 | 4/1966 | Molnar et al. | 343—6.8 |
| 3,362,025 | 1/1968 | Mori. | |
| 3,366,952 | 1/1968 | Mori | 343—6.8 X |
| 3,377,616 | 4/1968 | Auer. | |

RODNEY D. BENNETT, Jr., Primary Examiner

MALCOLM F. HUBLER, Assistant Examiner